Patented May 12, 1936

2,040,806

UNITED STATES PATENT OFFICE 2,040,806

SUBSTANCES CONTAINING SILVER AND METHODS OF PRODUCING THE SAME

Fritz Feigl, Vienna, Austria

No Drawing. Application August 25, 1934, Serial No. 741,525. In Austria May 15, 1933

8 Claims. (Cl. 99—220)

This invention relates to new silver-containing products and methods of manufacturing the same. The products according to the invention are particularly well suited for therapeutic, disinfectant, and other technical purposes in consequence of their specific efficacy.

The products according to the invention contain silver in an effective form, preferably jointly with or on further substances of an active nature such as substances of an oxidizing nature, the present new method of manufacture yielding invariably products in which the active components are present in a perfectly homogeneous and extremely finely divided state. Further, the new method of manufacture according to the invention makes it possible to impregnate a great variety of carrier substances with the active silver product or a mixture thereof with oxidic metallic compounds which yield oxygen, and that with great uniformity and in a simple and economic manner. In addition to the valuable therapeutic and disinfectant properties, the products according to the invention are also suitable for many technical and industrial purposes, for example for use as catalysts for reactions in which silver is effective as catalyst, and in which the oxygen-yielding metallic oxide (for example pyrolusite) contained in the product cancels the deterrent of various substances (such as $H_2S$, $AsH_3$, $S$, and the like) which are prejudicial to the catalyzing action of silver.

The process according to the invention consists in subjecting silver compounds in which the silver is preferably bound in an ionogenous form, that is to say in a form in which it is capable of reaction, together with metallic compounds which are capable of forming oxides, hydroxides, or basic salts in a number of valencies, to the action of compounds which yield hydroxyl ions, preferably in an aqueous medium. The hydroxyl ions can be supplied by the addition of alkalinely reacting substances of any kind, such as for instance fixed alkalies, ammonia, organic bases, and their carbonates, but also by the employment of oxides, hydroxides, or basic salts of the silver participating in the reaction or of the metals themselves which occur in a number of valencies. For example, there are suitable for the carrying out of the manufacturing process according to the invention manganous, cobaltous, ferrous, and cerous salts on the one hand, and silver compounds, for example silver nitrate and silver sulphate, on the other hand. On the reaction of these substances in an alkaline medium there result bulky but well filterable, and readily washed out precipitates which consist of extremely finely divided silver and of the higher valency oxides or hydroxides of the polyvalent metals.

I have found that substances obtained in this manner have eminent bactericidal properties, and, as compared with the known silver preparations, in addition to many advantages of an economic nature, possess very considerable therapeutical merits. As already indicated, these products possess, in addition to the effects of the finely divided silver, the favorable properties of the thus particularly active oxidic compounds of the polyvalent metals employed which also cancel the detrimental effect of for example sulphur-yielding substances upon Ag. There is here given as an example a reaction product from manganous salt, silver nitrate, and alkali, which after short washing with water, represents a bulky precipitate of a homogeneous mixture of pyrolusite (manganese dioxide) and silver the favorable properties of which are far superior to those of a mere mixture of pyrolusite and silver produced in any other manner.

Very particular advantages are provided by one form of the process according to the invention which consists in depositing the substances produced in accordance with the invention during their evolution directly upon carrier substances of a large variety of kinds.

As carrier substances there may serve, for instance in the production of disinfectant and even permanently sterile dressing and wound-treating material, fibrous matter of all kinds such as textile fibres, cotton, fabric, and paper; further, there can also be employed as carriers, substances such as animal charcoal, silica gels, bole, and other pulverulent substances which are themselves innocuous for the purpose in view, and which are at the same time capable themselves of serving as yielders of hydroxyl ions. This can be effected either by a preliminary treatment of the carrier material with substances of alkaline reaction, for example by steeping, spraying, or the like, or by the employment, as carriers, of substances which themselves have sufficient alkaline reaction, such as for example carbonates of the alkaline earths, oxides such as MgO, ZnO, and the like. In all these cases it is sufficient to treat such carrier material preferably with a solution of the starting materials, and then to wash out any surplus of these substances.

In many cases it is advantageous to cause the reaction to proceed in the presence of protective colloids such as for example albuminous substances, vegetable mucilage, lecithins, and the like. In this manner it becomes possible to produce colloidal solutions or extremely fine suspensions of the reaction products which prove efficacious as active substances for the treatment of various infectious diseases, for example gonorrhea.

As carrier substances there can of course also be used substances (for example animal charcoal) which are themselves therapeutically active. The substances according to the present invention can likewise be evolved in the presence of further therapeutically active substances known per se, whereby in many cases there are again obtained products having properties far superior to those of mere mixtures of the supplementary substances with the finished reaction products according to the present invention.

The new products are also particularly well suited for the preparation of ointments, for which purpose the active silver and metallic oxide mixture is made up with any suitable unguent base.

In those cases in which it is desired to employ the silver precipitated in accordance with the invention, without further reaction components, the latter can be separated from the silver by suitable solution reactions. For example, from a mixture of silver and pyrolusite the latter can be readily removed by the action of hydrogen peroxide in a solution rendered acid by means of sulphuric acid or its compounds. The silver remains behind in an active form. With the employment of the process according to the invention, the quantity of the resulting reaction products, such as for example silver and higher valency metallic oxide, can be accurately predetermined by apportionment of the quantity of the substance used for supplying hydroxyl ions. It is possible for example to preliminarily impregnate a carrier material to be treated, such as fibrous matter, with a measured quantity of alkali. If this fibrous material be then caused to react for example with the solution of a mixture of surplus silver nitrate and manganous sulphate, there will be deposited upon the fibrous material only that quantity of silver and manganese dioxide which is equivalent to the alkali used, as determined by the equation $$2Ag^{\cdot} + Mn^{\cdot\cdot} + 4OH' = 2Ag\downarrow + MnO_2\downarrow + 2H_2O.$$

The sequence of admixture, as also the quantitative proportions of the individual reaction components used, can also, however, be varied to suit the purpose in view at any one time, that is to say it is possible, for example, first to steep the carrier material in solutions of liquids containing mangano ions and silver ions, and then to render the whole alkaline. The same applies when use is made of other metallic compounds (metal salts) of metals which are capable of existing in a plurality of valencies.

The following examples are not to be considered as exclusive, and I do not limit myself to the precise conditions or proportions set forth, as they can be varied by those skilled in the art, to suit varying conditions and purposes.

Examples (1) To a solution of 170 grams of silver nitrate and 145 g. of manganese nitrate $$(Mn(NO_3)_2.6H_2O)$$

in 5 litres of water there is added caustic soda solution until alkaline reaction is obtained. The precipitate is drawn off, washed free of alkali, and dried at 100° C. There results a brown-black loose powder which consists of extremely finely subdivided silver and quadrivalent manganese oxides in perfectly homogeneous distribution.

(2) 2 litres of 20% solution of sodium silicate is allowed to flow, under stirring, into 2 litres of a solution of 40 g. of silver nitrate and 34 g. of manganese nitrate, and heated for an hour on a water bath. The precipitate is drawn off, and washed free of alkali with hot water. The product, after having been dried at 100–110° C., and pulverized, represents a greyish black powder with a silver content of about 10%.

(3) Close mesh gauze is dipped into a solution of 170 g. of silver nitrate and 145 g. of manganese nitrate in 3 litres of water, moved to and fro in the bath for some minutes, pressed out, and placed for some minutes in standard caustic soda solution. The gauze is then well washed in water, and dried.

(4) 50 g. of gelatine is dissolved in a litre of water, boiled for some minutes, and given the addition of a solution of seventeen grams of silver nitrate and 14.5 g. of manganese nitrate in 500 cc. of water. Into this solution there is allowed to flow 500 cc. of standard caustic soda solution, with constant stirring. The densely black, stable, colloidal solution is then dialyzed for several days with water, until the dialysate is of neutral reaction, and then if necessary filtered.

(5) An aqueous solution of 2 mols of silver nitrate and 1 mol. of cerous sulphate receives the addition of sufficient caustic soda solution to bring about alkaline reaction, after which the resulting precipitate is worked up in the manner given in Example 1. This precipitate likewise represents a blackish loose powder.

The double decomposition takes place in accordance with the following reaction equation:

$$2AgNO_3 + Ce_2(SO_4)_3 + 8NaOH = 2Ag\downarrow + 2Ce(OH)_4\downarrow + 4Na_2SO_4$$

(6) An aqueous solution containing 1 mol. each of silver nitrate and ferrous sulphate receives the addition of sufficient caustic soda solution to bring about alkaline reaction. The blackish brown precipitate obtained is worked up as specified in Example 1. The double decomposition takes place in accordance with the following equation:

$$AgNO_3 + FeSO_4 + 3NaOH = Ag\downarrow + Fe(OH)_3\downarrow + NaNO_3 + Na_2SO_4$$

(7) An aqueous solution containing 1 mol. each of silver nitrate and cobalt nitrate is given the addition of sufficient caustic soda solution to bring about alkaline reaction. The black precipitate obtained is worked up as specified in Example 1. The double decomposition takes place on similar lines to those of Example 6.

(8) To obtain a calcium carbonate product impregnated or covered with silver and manganese dioxide powdered calcium carbonate is introduced into an aqueous solution containing both a soluble silver salt (for example $AgNO_3$, $Ag_2SO_4$) and also a soluble manganous salt (for example $MnSO_4$, $Mn(NO_3)_2$) in any desired proportions, with the production of a suspension. The white calcium carbonate thereby becomes coated, accompanied by partial double decomposition, with a black, dense, active deposit in which silver and manganese dioxide are present in the respective proportions of 2:1, reckoning in mols. After having been washed with water, this product can be used as an active constituent of ointments, dusting powders, tooth-powder, and the like.

The products according to the invention are also admirably well suited for the sterilizing and preserving of various substances, for example liquids such as fruit juices, and more particularly non-sterile water. Liquids can be rendered practically perfectly sterile by being caused to flow over a filter mass made from the described reaction products, and preferably deposited on to a porous carrier material. It is further advantageous to impregnate the inner walls of storage vessels and containers with the reaction products according to the invention, or to place liners impregnated in this manner into other vessels and containers.

For the storage and transportation of fruit or other material or goods liable to spoil, packing material such as wood wool, sawdust, cork meal, and the like impregnated or mixed with products according to the invention are admirably suited.

I claim:

1. As a new article of commerce, for therapeutical, disinfectant, and sterilizing purposes, a carrier impregnated with a homogeneous mixture of extremely finely divided silver and manganese dioxide in the mol. proportions, respectively, of 2:1.

2. As a new article of commerce, for therapeutical, disinfectant, and sterilizing purposes, a fibrous carrier impregnated with a homogeneous mixture of extremely finely divided silver and manganese dioxide in the respective mol. proportions of 2:1.

3. The method of preparing a composition for therapeutical, disinfectant, or sterilizing purposes consisting of a mixture of finely divided metallic silver and a higher valency oxidic compound of a multivalent metal in which the stated components are present in molecular admixture in a constant stoichiometric ratio; which comprises reacting in an alkaline medium an ionizable silver salt with a metal compound in which the metal of said oxidic compound is present in a lower valence, the reaction being effected in the absence of compounds which will form soluble complex salts with the said metal compounds of lower valence.

4. The method of preparing a composition for therapeutical, disinfectant, or sterilizing purposes consisting of a mixture of finely divided metallic silver and manganese dioxide in the mol. proportions, respectively, of 2:1; which comprises reacting in an alkaline medium an ionizable silver salt with a manganese compound in which the manganese is present in a lower valence.

5. The method of preparing an article for therapeutical, disinfectant, or sterilizing purposes consisting of a carrier impregnated with finely divided metallic silver and a higher valency oxidic compound of a multivalent metal in which the stated components are present in molecular admixture in a constant stoichiometric ratio; which comprises impregnating an inert carrier with a substance of alkaline reaction, bringing the thus impregnated carrier into contact with a solution containing an ionizable silver salt and a metal compound in which the metal of said oxidic compound is present in a lower valence, and washing and drying the carrier thus treated, said method being effected in the absence of compound which would form soluble complex salts with the said metal compounds of lower valence.

6. A new composition of matter, for therapeutical, disinfectant or sterilizing purposes, comprising a homogeneous mixture of extremely finely divided metallic silver and a higher valency oxidic compound of a different metal capable of existing in a plurality of valencies, the stated components being present in molecular admixture in constant stoichiometric ratio.

7. A new composition of matter, for therapeutical, disinfectant or sterilizing purposes, comprising a homogeneous mixture of extremely finely divided metallic silver and manganese dioxide in the mol. proportions, respectively, of 2:1.

8. A new composition of matter, for therapeutical, disinfectant or sterilizing purposes, comprising a homogeneous mixture of extremely finely divided metallic silver and cerium hydroxide—$Ce(OH)_4$—in the mol. proportions, respectively, of 1:1.

FRITZ FEIGL.